United States Patent [19]

Jennings

[11] Patent Number: 5,048,274

[45] Date of Patent: Sep. 17, 1991

[54] APPARATUS AND METHOD FOR CONTROLLING MULTIPLE FUNCTIONS OF AN AGRICULTURAL IMPLEMENT

[75] Inventor: Richard E. Jennings, Manheim, Pa.

[73] Assignee: Ford New Holland, Inc., New Holland, Pa.

[21] Appl. No.: 538,612

[22] Filed: Jun. 15, 1990

[51] Int. Cl.$^5$ ............... A01D 37/00; F01L 33/00
[52] U.S. Cl. .................... 56/10.2; 56/341; 56/DIG. 2; 91/189; 172/324
[58] Field of Search .......... 91/189; 56/10.2, 10.6, 56/10.7, 10.1, 218, 341, DIG. 2, DIG. 5; 172/324, 465, 470, 488

[56] References Cited

U.S. PATENT DOCUMENTS

| | | | |
|---|---|---|---|
| 2,765,627 | 10/1956 | Chambers et al. | 91/512 |
| 2,844,942 | 7/1958 | Reynolds | 91/517 |
| 2,961,015 | 11/1960 | Randall | 83/508.3 |
| 3,459,268 | 8/1969 | Forster | 172/488 |
| 3,596,565 | 8/1971 | Atkinson | 91/392 |
| 3,947,981 | 4/1976 | Shore | 37/126 AE |
| 4,067,394 | 1/1978 | Deckler | 172/2 |
| 4,428,706 | 1/1984 | Butler, et al. | 414/24.5 |
| 4,817,730 | 4/1989 | Winter | 172/328 |

FOREIGN PATENT DOCUMENTS 743384 9/1966 Canada ............... 56/10.7

*Primary Examiner*—Ramon S. Britts
*Assistant Examiner*—David J. Bagnell
*Attorney, Agent, or Firm*—Darrell F. Marquette; Frank A. Seemar; Larry W. Miller

[57] ABSTRACT

Apparatus for controlling multiple functions of an agricultural implement such as a baler or a harvester includes first, second and third hydraulic cylinders which are operated to control first, second and third functions, respectively, of the implement. A shuttle valve is mechanically coupled to the first hydraulic cylinder by a rock shaft so that when the first hydraulic cylinder is retracted and extended, the shuttle valve selectively connects either the second or the third hydraulic cylinder to an independent source of hydraulic fluid. The first hydraulic cylinder is connected to another independent source of hydraulic fluid. In a baler having a bale case, a pickup, a tongue and a bale thrower, the first hydraulic cylinder raises and lowers the pickup, the second hydraulic cylinder moves the tongue between a transport position and an operating position, and the third hydraulic cylinder adjusts the bale thrower relative to the bale case.

10 Claims, 5 Drawing Sheets

APPARATUS AND METHOD FOR CONTROLLING MULTIPLE FUNCTIONS OF AN AGRICULTURAL IMPLEMENT

BACKGROUND OF THE INVENTION

This invention relates generally to farm machinery and, in particular, to apparatus and a method for controlling multiple functions of an implement such as an agricultural baler.

Farm tractors of today typically have one or two independent hydraulic circuits which can be connected to the hydraulic lines of an implement to control multiple functions of the implement while it is attached to the tractor. In the past, when attaching an implement to an open cab tractor which has only one hydraulic circuit, many functions of the implement were controlled manually by the tractor operator using devices such as pull ropes and crank arms.

More recently, however, electrical servo valves have been utilized to control implement functions. These servo valves are undesirable because they are expensive and unreliable. Furthermore, they are not compatible with some tractors and also result in complex wiring on some tractors. Electric linear actuators have also been used to control implement functions but they lack reliability and are too costly.

Open cab tractors have included selector valves in their hydraulic circuits to enable the tractor operator to control two independent functions of an implement by manually shifting a selector valve to the desired position. However, these selector valves are undesirable on tractors with enclosed cabs because it is difficult to locate them inside the cab while they are still hooked into the hydraulic circuit of the tractor. Furthermore, these selector valves are not desirable because it is easy for the operator to forget what position the valve is in, and there is usually no logical mounting location for the valve in the enclosed cab of a tractor.

SUMMARY OF THE INVENTION

The present invention provides apparatus and a method for controlling multiple functions of an implement. The apparatus includes a first hydraulic cylinder for controlling a first function of the implement, a second hydraulic cylinder for controlling a second function of the implement, and a third hydraulic cylinder for controlling a third function of the implement. Valve means is coupled to the first hydraulic cylinder for selectively connecting a first source of hydraulic fluid to one of said second and third hydraulic cylinders. The first hydraulic cylinder is connected to a second source of hydraulic fluid which is independent from the first source of hydraulic fluid. The method includes operating the first hydraulic cylinder in a manner to mechanically shift the valve means between two positions so that the second and third hydraulic cylinders are selectively connected to the first source of hydraulic fluid.

DESCRIPTION OF THE PREFERRED EMBODIMENT

Figure 1:
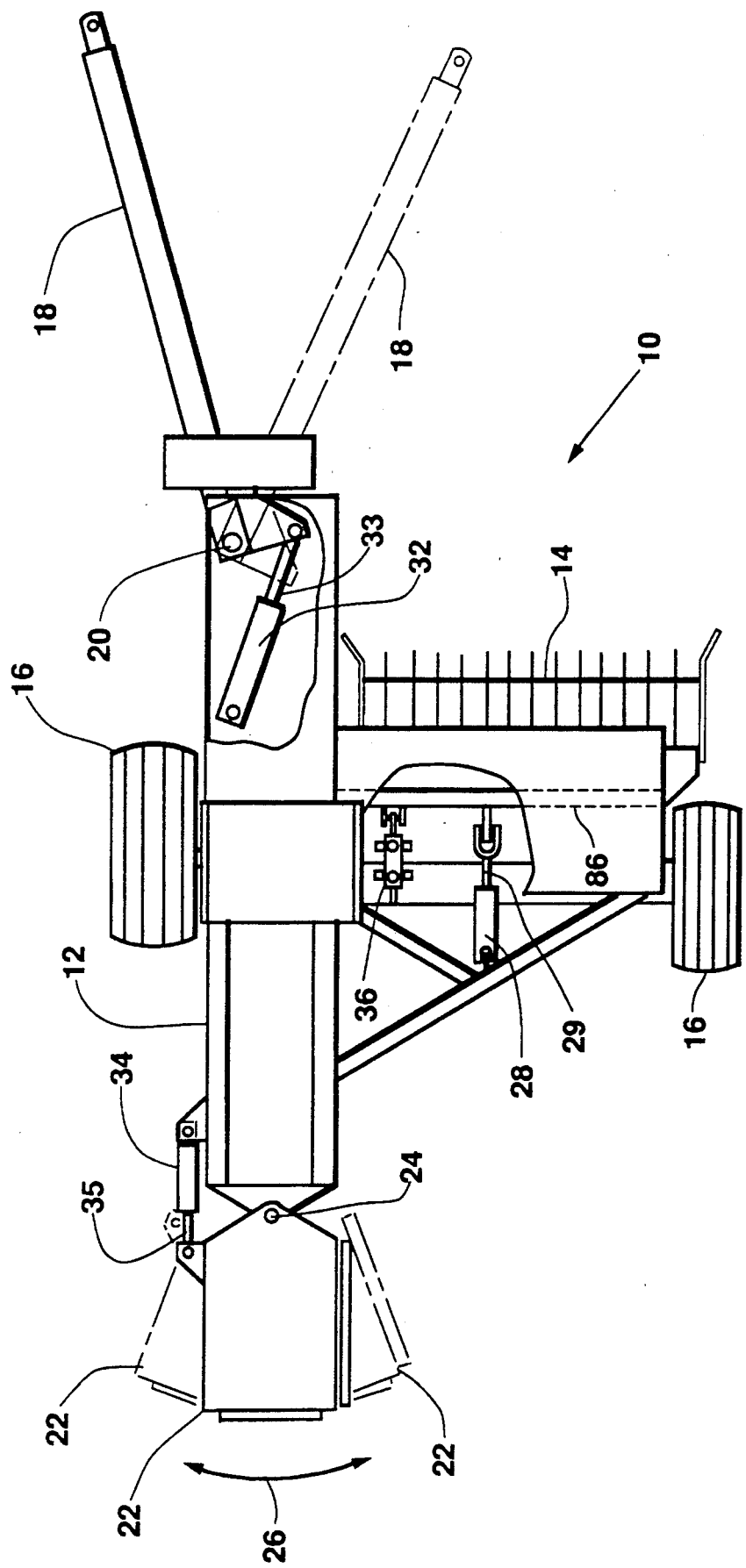
FIG. 1 is a top plan view of an agricultural baler incorporating apparatus according to the present invention.
Figure 2:
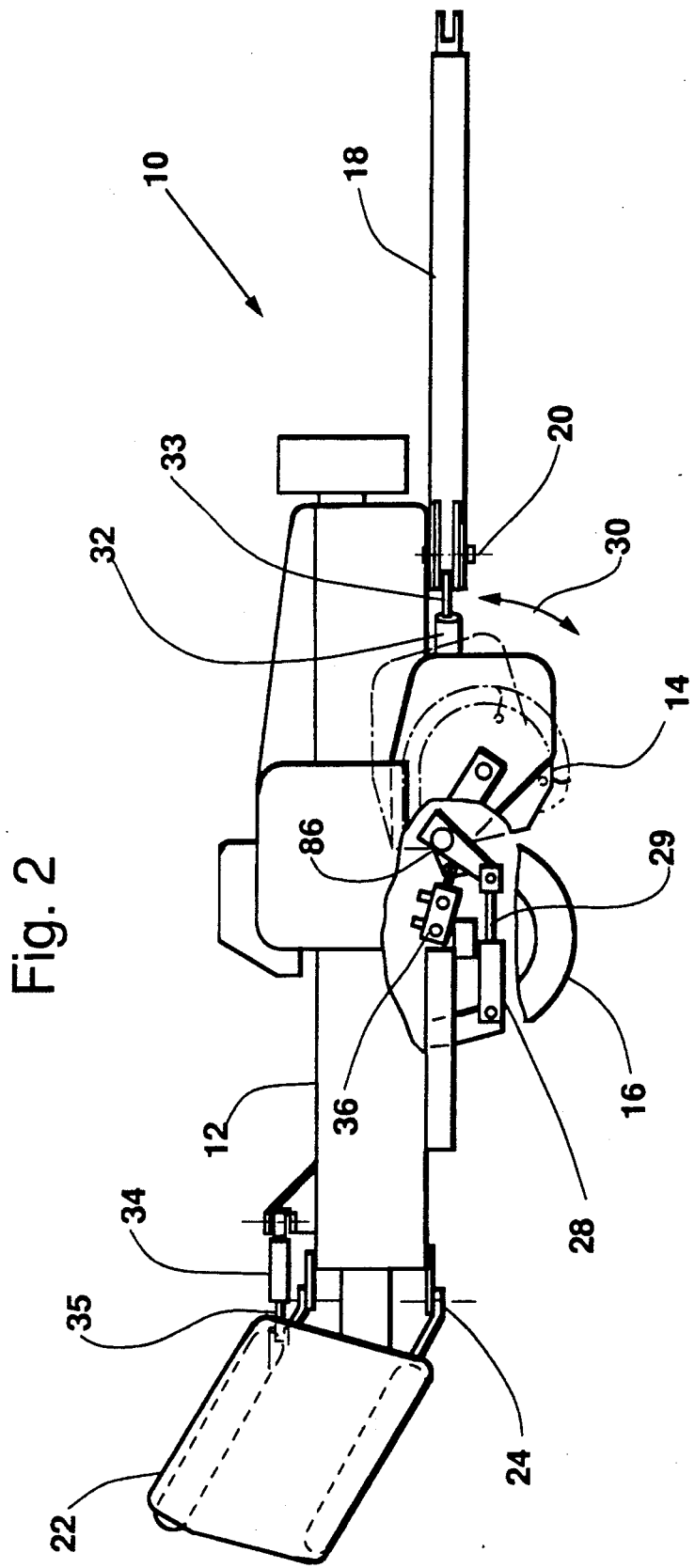
FIG. 2 is a side elevation view of the agricultural baler shown in FIG. 1.

Referring to FIGS. 1 and 2, an agricultural baler 10 of the conventional type used for making rectangular bales of crop material is illustrated. The baler 10 includes a bale case 12 and a pickup 14 supported by a pair of wheels 16. A tongue 18 is pivotally connected at 20 to a forward portion of the bale case 12, and a bale thrower 22 is pivotally connected at 24 to a rearward portion of the bale case 12. Bale thrower 22 is preferably of a conventional type such as disclosed in U.S. Pat. No. 3,987,890. Tongue 18 is movable between an operating position shown in solid lines in FIG. 1 and a transport position shown in broken lines in FIG. 1. Bale thrower 22 is movable in a horizontal arc 26 between the solid line position and the broken line positions illustrated in FIG. 1.

According to the present invention, a first hydraulic cylinder 28 is connected to the pickup 14 for raising and lowering the pickup 14 in a vertical arc 30. A second hydraulic cylinder 32 is connected between the bale case 12 and the tongue 18 to effect movement of the tongue 18 between its transport and operating positions. A third hydraulic cylinder 34 is connected between the bale case 12 and the bale thrower 22 for adjusting the bale thrower 22 in the horizontal arc 26 relative to the bale case 12. A shuttle valve 36 is mechanically coupled to the first hydraulic cylinder 28 so that, when the pickup 14 is raised and lowered, the shuttle valve 36 is shifted back and forth between two positions. Hydraulic cylinders 28, 32 and 34 are double acting. Shuttle valve 36 may be of a conventional type such as valve no. 516642 sold by Ford New Holland, Inc.

Baler 10 may be shifted between a transport mode wherein the pickup 14 is raised and the tongue 18 is in its transport position, and an operating mode wherein the pickup 14 is lowered and the tongue 18 is in its operating position. Bale thrower 22 may be moved between the solid line position and the broken line positions shown in FIG. 1 only when the baler 10 is in the operating mode.

Figure 3:
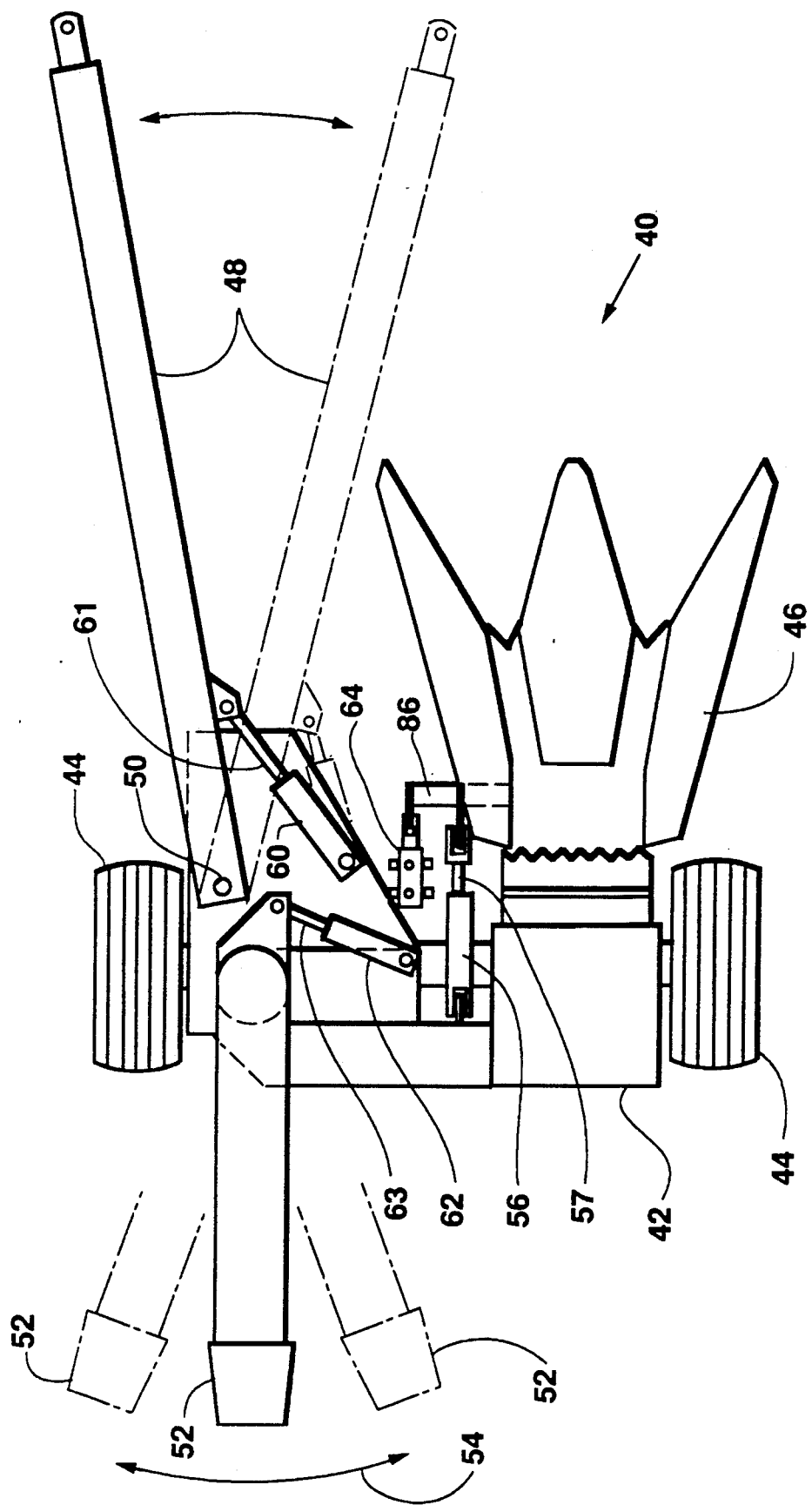
FIG. 3 is a top plan view of an agricultural harvester incorporating apparatus according to the present invention.
Figure 4:
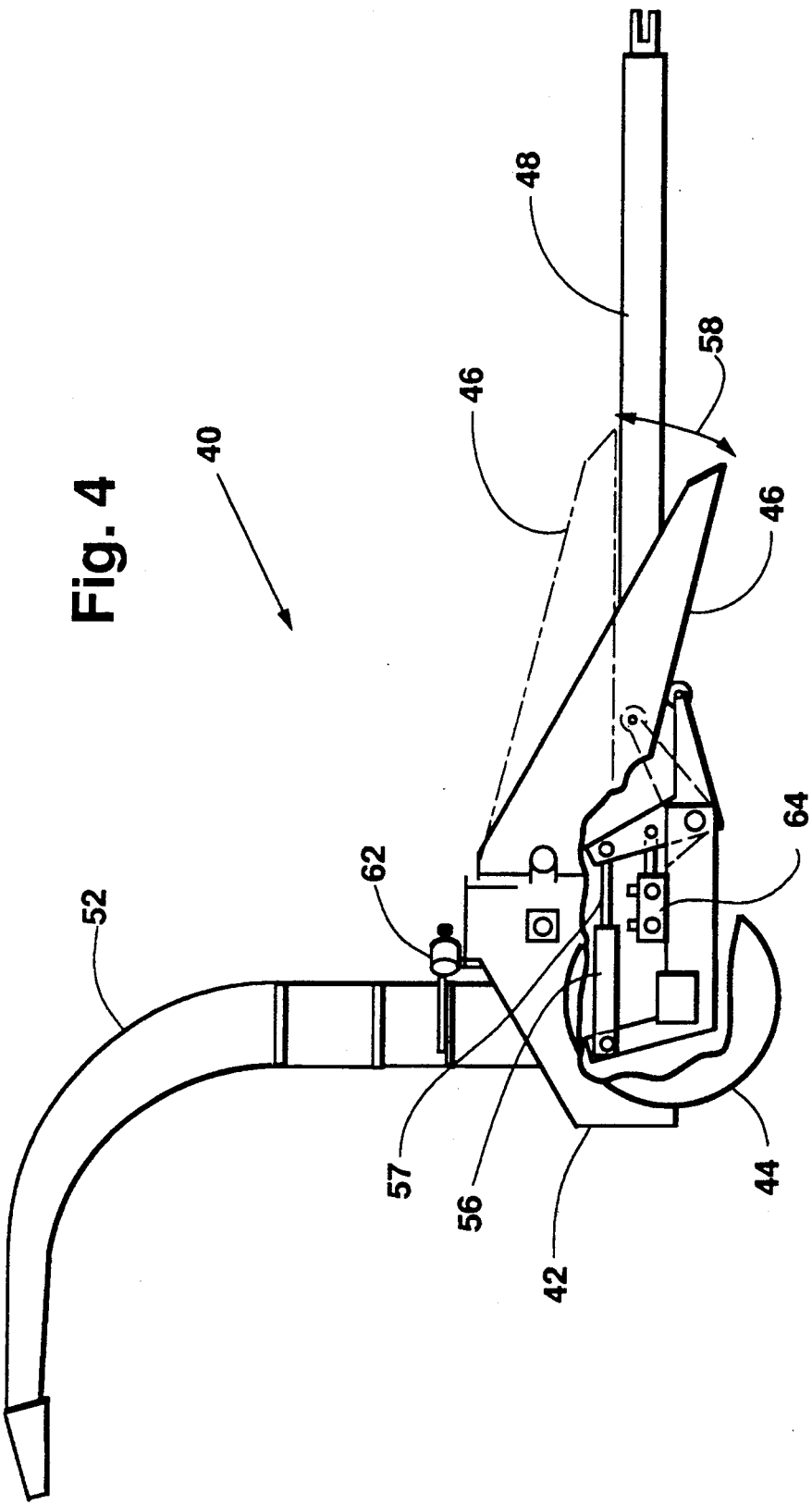
FIG. 4 is a side elevation view of the agricultural harvester shown in FIG. 3.

Referring to FIGS. 3 and 4, an agricultural harvester 40 of the conventional type used for harvesting forage is illustrated. The harvester 40 includes a base unit 42 supported by pair of wheels 44. A header 46 is mounted on a forward portion of the base unit 42. A tongue 48 is pivotally connected at 50 on the forward portion of the base unit 42 for movement between an operating position shown in full lines in FIG. 3 and a transport position shown in broken lines in FIG. 3. A spout 52 is pivotally mounted on the base unit 42 for movement in a horizontal arc 54 between the solid line position and the broken line positions illustrated in FIG. 3.

In accordance with the present invention, a first hydraulic cylinder 56 is connected to the header 46 to raise and lower the header 46 in a vertical arc 58. A second hydraulic cylinder 60 is connected between the base unit 42 and the tongue 48 to effect movement of the tongue 48 between its operating and transport positions. A third hydraulic cylinder 62 is connected between the base unit 42 and the spout 52 for adjusting the spout 52 in the horizontal arc 54 relative to the base unit 42. A shuttle valve 64 (identical to shuttle valve 36) is mechanically coupled to the first hydraulic cylinder 56 so that the shuttle valve 64 will be shifted back and forth between two positions when the header 46 is raised and lowered. Hydraulic cylinders 56, 60 and 62 are double acting.

Harvester 40 may be shifted between a transport mode wherein the header 46 is raised and the tongue 48 is in its transport position, and an operating mode wherein the header 46 is lowered and the tongue 48 is in its operating position. Spout 52 may be moved between the solid line position and the broken line positions shown in FIG. 3 only when the harvester 40 is in the operating mode.

Figure 5:
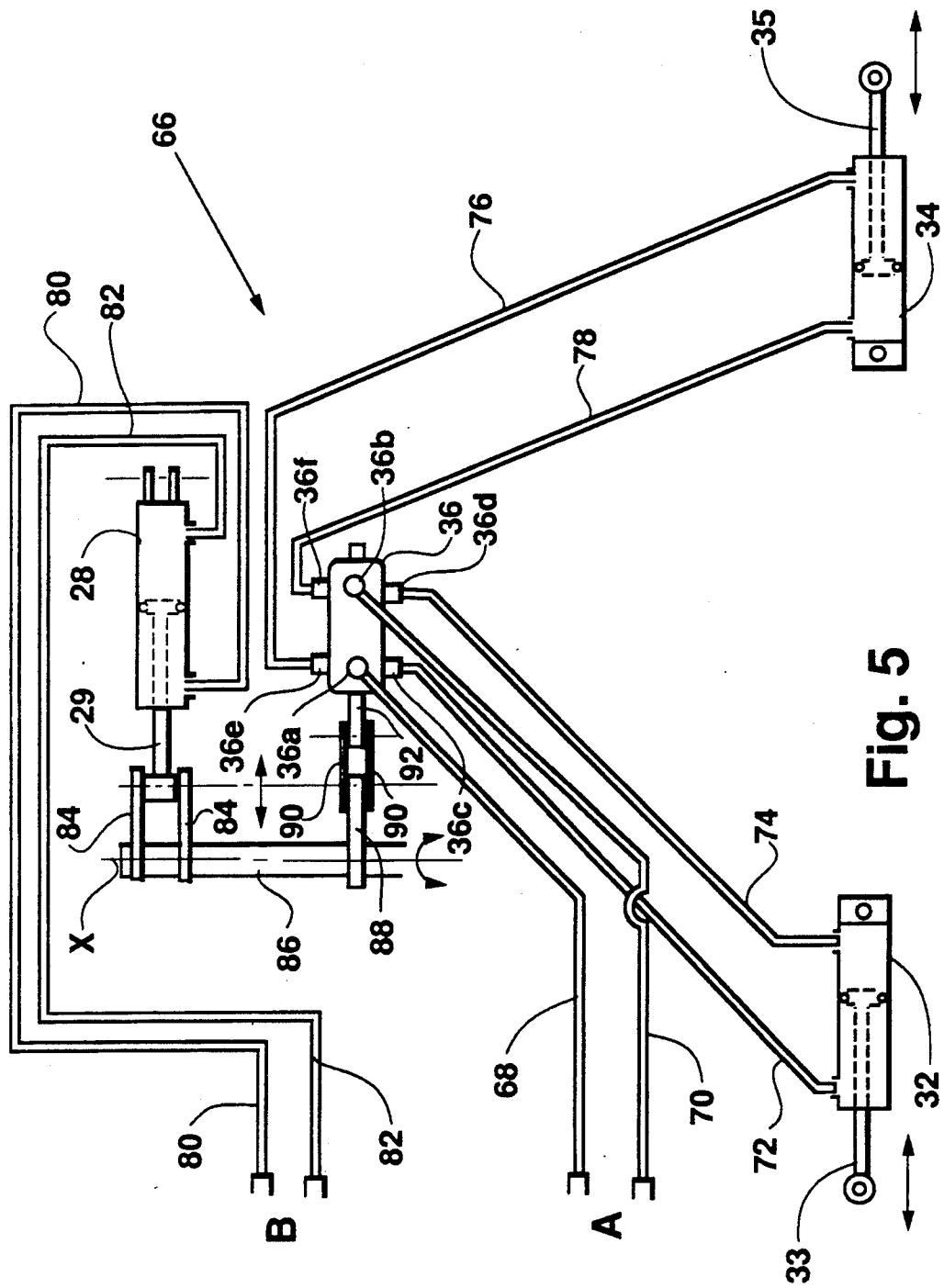
FIG. 5 is a schematic view of the apparatus of the present invention.

Apparatus 66 for controlling multiple functions of the baler 10 is illustrated in FIG. 5. The apparatus 66 incorporates the shuttle valve 36 which has inlet ports 36a, 36b connected by hoses 68, 70 to a hydraulic circuit A on a tractor. Outlet ports 36c, 36d on the shuttle valve 36 are connected to opposite ends of the hydraulic cylinder 32 by hoses 72, 74. Shuttle valve 36 also has outlet ports 36e, 36f connected by hoses 76, 78 to opposite ends of the hydraulic cylinder 34. Another hydraulic circuit B on the tractor is connected by hoses 80, 82 to the opposite ends of the hydraulic cylinder 28. Tractor hydraulic circuits A and B provide two independent sources of hydraulic fluid.

As seen in FIG. 5, hydraulic cylinder 28 has a piston rod 29 pivotally connected to a pair of crank arms 84 which are fixed to a rock shaft 86. Another crank arm 88, which is also fixed to the rock shaft 86, is pivotally connected by a pair of links 90 to a stem 92 attached to a spool (not shown) in the shuttle valve 36. Rock shaft 86 is preferably mounted for oscillating movement about a horizontal axis X. Piston rod 29 is extended by operating a control lever (not shown) mounted on the tractor to deliver fluid from hydraulic circuit B through the hose 82 into one end of hydraulic cylinder 28. Conversely, piston rod 29 is retracted by operating the control lever to deliver fluid from hydraulic circuit B through the hose 80 into the other end of the hydraulic cylinder 28. Extension and retraction of piston rod 29 causes the rock shaft 86 to oscillate back and forth about the horizontal axis X. This oscillation of the rock shaft 86 causes the spool in the shuttle valve 36 to be moved between two positions within the shuttle valve 36. In one position of the spool, the inlet ports 36a, 36b are in fluid communication with the outlet ports 36c, 36d while in the other position of the spool, the inlet ports 36a, 36b are in fluid communication with the outlet ports 36e, 36f. Therefore, tractor hydraulic circuit A may be selectively connected to the hydraulic cylinder 32 or to the hydraulic cylinder 34.

When it is desired to shift the baler 10 into the transport mode, the control lever associated with tractor hydraulic circuit B is actuated to deliver fluid through hose 82 into the hydraulic cylinder 28 thereby extending the piston rod 29 and raising the pickup 14 in the vertical arc 30. Extension of piston rod 29 oscillates the rock shaft 86 in a direction which moves the spool in the shuttle valve 36 to the position where the inlet ports 36a, 36b are in fluid communication with the outlet ports 36c, 36d. In this position of the spool, there is no fluid communication between the inlet ports 36a, 36b and the outlet ports 36e, 36f. A control lever (not shown) associated with tractor hydraulic circuit A is then actuated to deliver fluid through hoses 68 and 72 into one end of the hydraulic cylinder 32 thereby retracting piston rod 33 which moves the tongue 18 into its transport position. Simultaneously, fluid is returned to the tractor hydraulic circuit A from the other end of the hydraulic cylinder 32 via the hoses 74, 70.

Subsequently, when it is desired to shift the baler 10 from the transport mode into the operating mode, the control lever associated with tractor hydraulic circuit A is actuated to deliver fluid through hoses 70 and 74 into the hydraulic cylinder 32 to extend piston rod 33. This extension of piston rod 33 moves the tongue 18 from the transport position to the operating position. Then, the control lever associated with the tractor hydraulic circuit B is actuated to deliver fluid through hose 80 into hydraulic cylinder 28 thereby retracting piston rod 29 which causes oscillation of the rock shaft 86 in a direction that moves the spool in the shuttle valve 36 to the position where the inlet ports 36a, 36b are in fluid communication with the outlet ports 36e, 36f. In this position of the spool, there is no fluid communication between the inlet ports 36a, 36b and the outlet ports 36c, 36d. The control lever associated with the tractor hydraulic circuit A is then actuated to deliver fluid into the hydraulic cylinder 34 via the hoses 68, 76 or via the hoses 70, 78 in order to either extend or retract piston rod 35. Extension and retraction of piston rod 35 causes movement of the bale thrower 22 in the horizontal arc 26 between the solid line position and the broken line positions shown in FIG. 1.

Apparatus 66 may also be used to control multiple functions of the harvester 40 by replacing the hydraulic cylinders 28, 32 and 34 with the hydraulic cylinders 56, 60 and 62, respectively, and by replacing the shuttle valve 36 with the shuttle valve 64. In order to shift the harvester 40 into the transport mode, the control lever for the tractor hydraulic circuit B is actuated in a manner to retract piston rod 57 of hydraulic cylinder 56 thus raising the header 46. Retraction of piston rod 57 also causes a spool in shuttle valve 64 to be moved into a position permitting delivery of fluid from the tractor hydraulic circuit A into the hydraulic cylinder 60 to retract piston rod 61 and thereby move the tongue 46 into its transport position.

Harvester 40 is shifted into the operating mode by extending piston rod 61 which moves the tongue 46 from its transport position into its operating position. Piston rod 57 is then extended to lower the header 46 and simultaneously move the spool in shuttle valve 64 into a position permitting fluid to be delivered into the hydraulic cylinder 62 to extend and retract piston rod 63. Extension and retraction of piston rod 63 moves the spout 52 back and forth in the horizontal arc 54.

What is claimed is:

1. Apparatus for controlling multiple functions of an agricultural implement, comprising:
   a first hydraulic cylinder for controlling a first function of the implement;
   a second hydraulic cylinder for controlling a second function of the implement;
   a third hydraulic cylinder for controlling a third function of the implement;
   valve means coupled to said first hydraulic cylinder for selectively connecting a first source of hydraulic fluid to one of said second and third hydraulic cylinders; and said first hydraulic cylinder being connected to a second source of hydraulic fluid which is independent from said first source of hydraulic fluid.

2. The apparatus of claim 1, wherein said valve means comprises a shuttle valve shiftable between two positions, said shuttle valve connecting said first source of hydraulic fluid to said second hydraulic cylinder when said shuttle valve is in one of said two positions, and said shuttle valve connecting said first source of hydraulic fluid to said third hydraulic cylinder when said shuttle valve is in the other one of said two positions.

3. The apparatus of claim 2, wherein said shuttle valve is shifted between said two positions when said first hydraulic cylinder is extended and retracted.

4. The apparatus of claim 3, wherein said shuttle valve is mechanically coupled to said first hydraulic cylinder by a rock shaft.

5. The apparatus of claim 1, wherein:
said first hydraulic cylinder raises and lowers a pickup on a baler;
said second hydraulic cylinder moves a tongue on the baler between a transport position and an operating position; and
said third hydraulic cylinder adjusts a bale thrower mounted on the baler.

6. The apparatus of claim 5, wherein:
said first hydraulic cylinder raises and lowers a header on a harvester;
said second hydraulic cylinder moves a tongue on the harvester between a transport position and an operating position; and
said third hydraulic cylinder adjusts a discharge spout mounted on the harvester.

7. The apparatus of claim 1, wherein said first, second and third hydraulic cylinders are double acting.

8. Apparatus for controlling multiple functions of an agricultural baler having a bale case, a pickup, a tongue and a bale thrower, said apparatus comprising:
a first hydraulic cylinder for raising and lowering said pickup;
a second hydraulic cylinder for moving said tongue between a transport position and an operating position;
a third hydraulic cylinder for adjusting said bale thrower relative to said bale case;
a shuttle valve mechanically coupled to said first hydraulic cylinder for selectively connecting a first source of hydraulic fluid to one of said second and third hydraulic cylinders; and
said first hydraulic cylinder being connected to a second source of hydraulic fluid which is independent from said first source of hydraulic fluid.

9. Apparatus for controlling multiple functions of an agricultural harvester having a base unit with a header, a tongue and a discharge spout mounted thereon, said apparatus comprising:
a first hydraulic cylinder for raising and lowering said header;
a second hydraulic cylinder for moving said tongue between a transport position and an operating position;
a third hydraulic cylinder for adjusting said discharge spout relative to said base unit;
a shuttle valve mechanically coupled to said first hydraulic cylinder for selectively connecting a first source of hydraulic fluid to one of said second and third hydraulic cylinders; and
said first hydraulic cylinder being connected to a second source of hydraulic fluid which is independent from said first source of hydraulic fluid.

10. A method of controlling multiple functions of an agricultural implement, said method comprising the steps of:
operating a first hydraulic cylinder, which is connected to a first source of hydraulic fluid, in a manner to control a first function of the implement and in a manner to mechanically shift valve means to a position where a second hydraulic cylinder is selectively connected to a second source of hydraulic fluid that is independent from said first source of hydraulic fluid;
operating said second hydraulic cylinder in a manner to control a second function of the implement;
operating said first hydraulic cylinder in a manner to mechanically shift said valve means to another position where a third hydraulic cylinder is selectively connected to said second source of hydraulic fluid; and
operating said third hydraulic cylinder to control a third function of the implement.

* * * * *